United States Patent

[11] 3,536,098

[72] Inventor James J. Cunningham
 Baytown, Texas
[21] Appl. No. 775,362
[22] Filed Nov. 13, 1968
[45] Patented Oct. 27, 1970
[73] Assignee Esso Research and Engineering Company

[54] DIVERTER VALVE FOR PNEUMATIC CONVEYANCE SYSTEM
7 Claims, 5 Drawing Figs.

[52] U.S. Cl. .................................................. 137/610, 302/28
[51] Int. Cl. ................................................ F16k 11/00, F16k 25/00
[50] Field of Search ......................................... 137/625.11, 610, 636.4; 251/160, 161, 188, 192; 302(Inq), 28

[56] References Cited
UNITED STATES PATENTS

| | | | |
|---|---|---|---|
| 2,825,604 | 3/1958 | Sebestyen.................... | 302/28 |
| 3,071,230 | 1/1963 | Brakel et al................... | 302/28X |
| 3,395,731 | 8/1968 | Kauffman..................... | 137/610 |

Primary Examiner—M. Cary Nelson
Assistant Examiner—William R. Cline
Attorneys—Thomas B. McCulloch, Melvin F. Fincke, John S. Schneider, Sylvester W. Brock, Jr., Kurt S. Myers and Timothy L. Burgess ABSTRACT: A valve for use in pneumatic conveying systems having conveying pressures of up to about 150 p.s.i.g. and requiring an airtight switchover device to change a connection of a source line from one to another of a number of destination lines, or to switch a destination line from one to another of a number of source lines. An arcuate tube is sealingly sleeved at one end for axial and rotational movement on a stationary primary conduit adapted for connection to, e.g., a source line. A seating surface is formed into the periphery of an offset second end of the tube, which is rotatable about the axis of the primary conduit to confront a selected one of a plurality of stationary secondary conduits that are circumferentially spaced from the axis of the primary conduit equidistant the offset of the tube and are adapted to be connected to, e.g., a number of destination lines. The offset second end is axially moveable to be forced into a sealing relationship at its seating surface with a seat on a communicating end of the selected secondary conduit. Closure blanks may be circumferentially spaced about the axis of the primary conduit for rotational and axial movement with the second end to seal off the secondary conduits not selected and engaged by the second end.

Patented Oct. 27, 1970

INVENTOR.
JAMES J. CUNNINGHAM,
BY Timothy L. Burgess
ATTORNEY.

Patented Oct. 27, 1970

INVENTOR.
JAMES J. CUNNINGHAM,
BY
Timothy L. Burgess
ATTORNEY.

Patented Oct. 27, 1970

3,536,098

INVENTOR.
JAMES J. CUNNINGHAM
BY
Timothy L. Burgess
ATTORNEY

Patented Oct. 27, 1970

INVENTOR.
JAMES J. CUNNINGHAM,
BY
Timothy P. Burgess
ATTORNEY.

3,536,098

DIVERTER VALVE FOR PNEUMATIC CONVEYANCE SYSTEM

BACKGROUND OF THE INVENTION

1. Field of the Invention

This invention relates to pneumatic conveyance systems employed to transport particulate matter in an air stream through a pipeline, and more particularly, to valves or switching devices used in such systems to change a source line connection from one destination line to another destination line, or to switch a destination line from one source line to another source line.

2. Description of the Prior Art

The load and load per unit time of particulate solids that can be carried by a pneumatic conveying system employing switchover (diverter) valves is limited by pressure drop across a valve caused by air leakage from the valve at working pressures. Where a plurality of the valves are strung in series, as for delivery of particulate solids to multiple stations, the carrying capacity and transport rate of the system can depend on the total pressure drop across all the valves. As a result of this pressure loss, the capacity of industrial pneumatic conveyance systems is generally limited to 6 or 8 pounds of material per pound of air and to pressures of no more than about 15 to 20 p.s.i.g., with typically only about 7 or 8 p.s.i.g. being used. In addition, pressure surges, which may result from turbulence produced by the design of commercially practical valves, or from other causes, can drive air from the valves and cause plugging of the valves and shutdown of the system.

Accordingly, an object of this invention is to provide a diverter valve that is airtight, i.e., across which there is no static pressure loss, even at elevated pressures, for use in pneumatic conveyance systems that require a switching device between a source line and a plurality of destination lines, or between a plurality of source lines and a destination line, as a result of which use the load capacity and delivery rates of such systems can be increased.

Another object of this invention is to provide a diverter valve having relatively low internal turbulence and which is airtight, i.e., across which there is no static pressure loss, even at elevated pressures, for use in pneumatic conveyance systems that require a switching device between a source line and a plurality of destination lines, or between a plurality of source lines and a destination line, as a result of which use greater loads of particulate matter can be transported in pneumatic conveyance systems without line or valve plugging due to air loss at the valve.

Pneumatic conveyance systems are used, among other purposes, for the bulk transport of particulate solids of graded quality which even the most miniscule amount of foreign or offgrade matter would ruin. Diverter valves used in such systems must not provide a portal for entrance of contaminating matter. It is, therefore, yet another object of this invention to provide a diverter valve adapted for use in pneumatic conveyance systems that require a switching device between a source line and a plurality of destination lines, or between a plurality of source lines and a destination line, which will close off the destination or source lines not in use when a flow path is established from a source line to one of a plurality of destination lines, or from one of a plurality of source lines to a destination line.

SUMMARY OF THE INVENTION

Briefly, these and other objects of the invention are accomplished in accordance with this invention by a diverter valve comprised of an offset tube rotatingly and axially slideably, yet sealingly, mounted at one end on a cylindrical portion of a stationary primary conduit which is adapted to be connected to a single pneumatic line. The second end of the tube is axially spaced and offset from the axis of the aforesaid cylindrical portion, about which it is rotatable to positions in confronting relationship with each of the communicating means of a plurality of stationary secondary conduits that are adapted to be connected to pneumatic lines. The communication means of the second conduits are circumferentially spaced in a plane normal to, and equidistant the offset of the tube from, the axis of the aforesaid cylindrical portion. The offset second end has means for communicating with and sealingly engaging the communication means of a predetermined one of the secondary conduits when axially moved to contact said communications means, a sealing relationship therebetween being forceably maintained by means acting on the second end. Axial and rotational movement of said first and second ends, and in a particular form of the invention, of closure means, which are circumferentially spaced about the axis of the primary conduit for rotational and axial movement with the second end to blank off the secondary conduits not selected and engaged by the second end, are provided by suitable means.

BRIEF DESCRIPTION OF THE DRAWING

A form in which the invention may be embodied is shown in the drawings accompanying and forming part of the present specification. Referring to the drawings.

DESCRIPTION OF THE PREFERRED EMBODIMENTS

Figure 1:
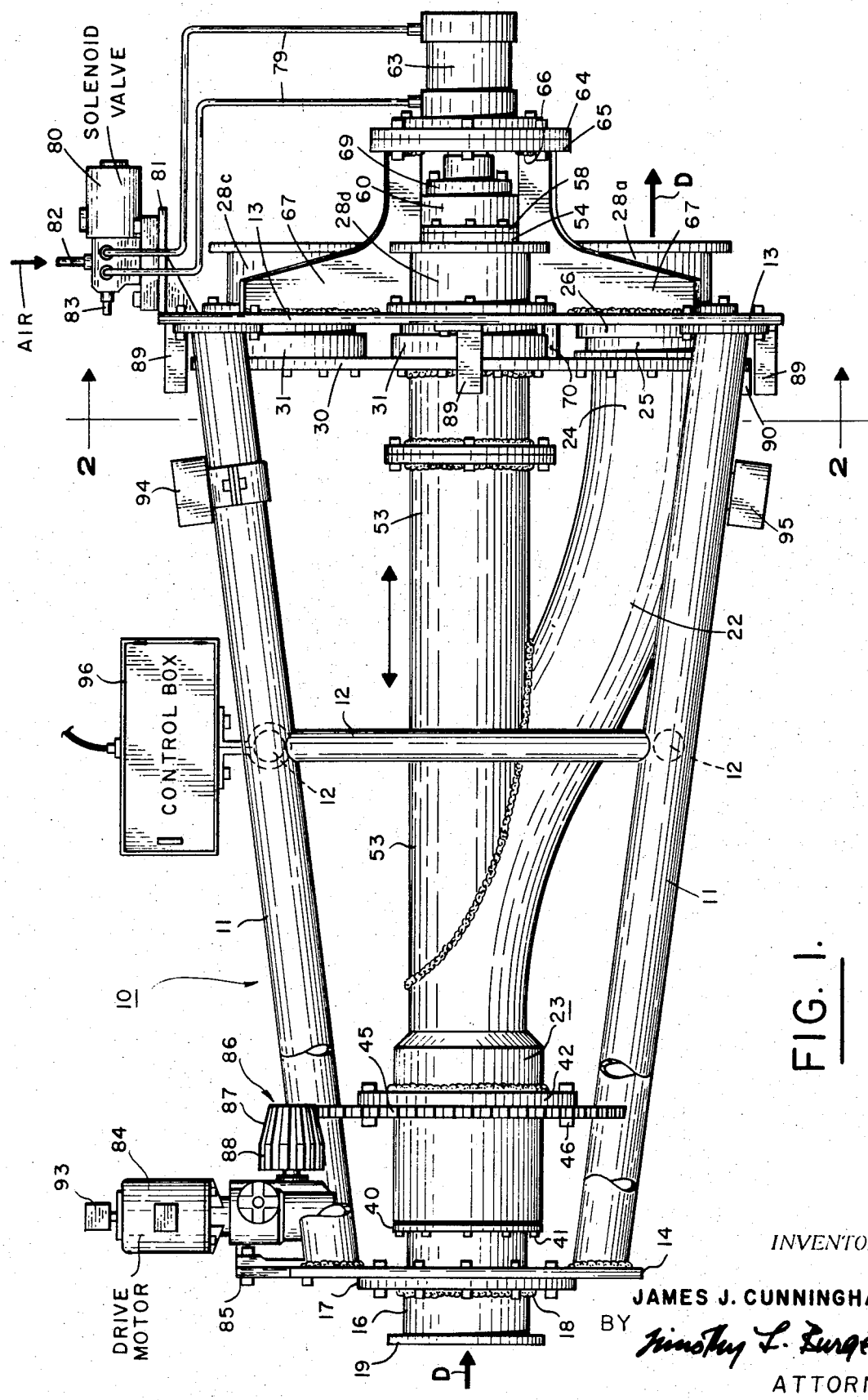
FIG. 1 is a side elevational view of a diverter valve made in accordance with this invention.

The form shown in the drawings will now be described in detail for the purpose of illustrating the general principles of the invention. It is to be understood, however, that such detailed description is not to be taken in the limiting sense, since the scope of the invention is best defined by the appended claims.

Figure 5:
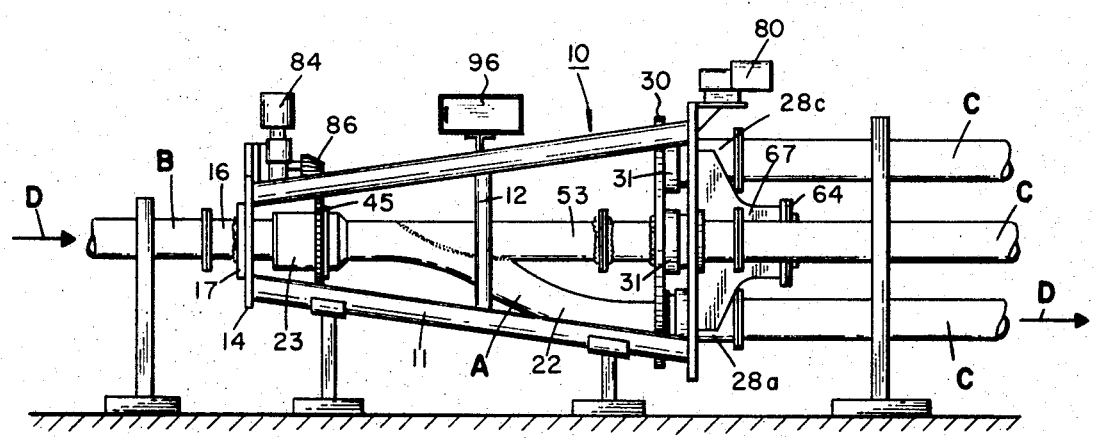
FIG. 5 is a somewhat diagrammatical side elevational view of the valve of FIG. 1 connected to lines of a pneumatic conveyance system.

Referring now to the drawings, and in particular to FIG. 5, a diverter valve A is illustrated which is adapted to be secured, at an upper end, to the terminal of a first pneumatic line B and, at a lower end, to the terminals of a plurality of second pneumatic lines C. The axes of the terminals of line C are circumferentially spaced and equidistant to the axis of the terminal of line B. The terminals of lines B and C may be disposed in any position between the horizontal and vertical. Pneumatic flow may be from line B to one of the lines C, which is the flow indicated by arrows D, or it may be from one of the lines C to line B.

Figure 2:
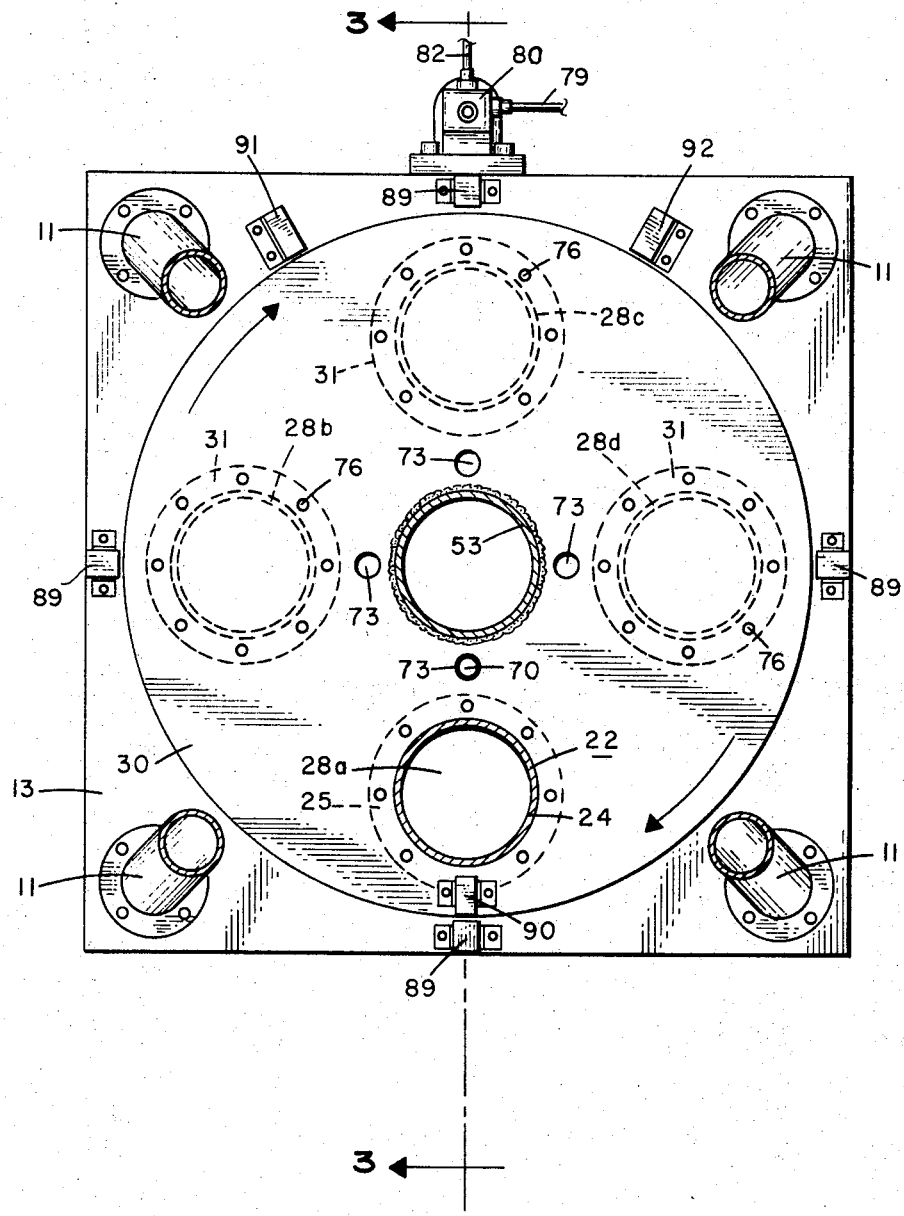
FIG. 2 is a plan view of the valve of FIG. 2 taken along the line 2–2 of FIG. 2.
Figure 3:
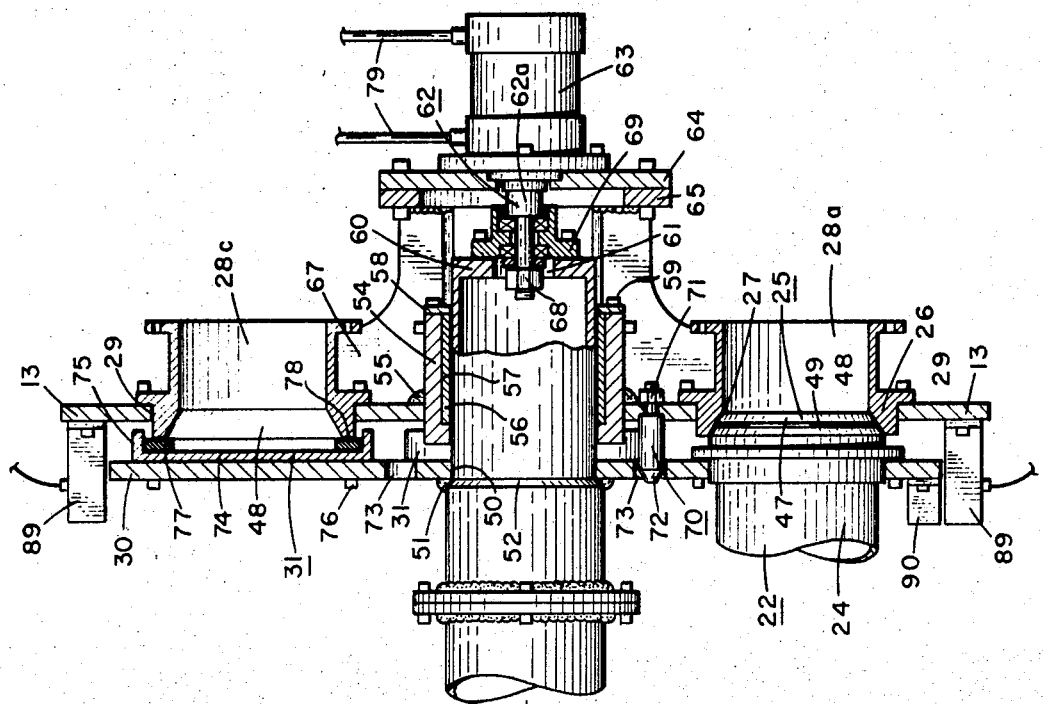
FIG. 3 is a longitudinal section view of the valve of FIG. 1, taken along the line 3–3 of FIG. 2, with parts thereof slightly enlarged from FIG. 1 for better illustration.
Figure 3:
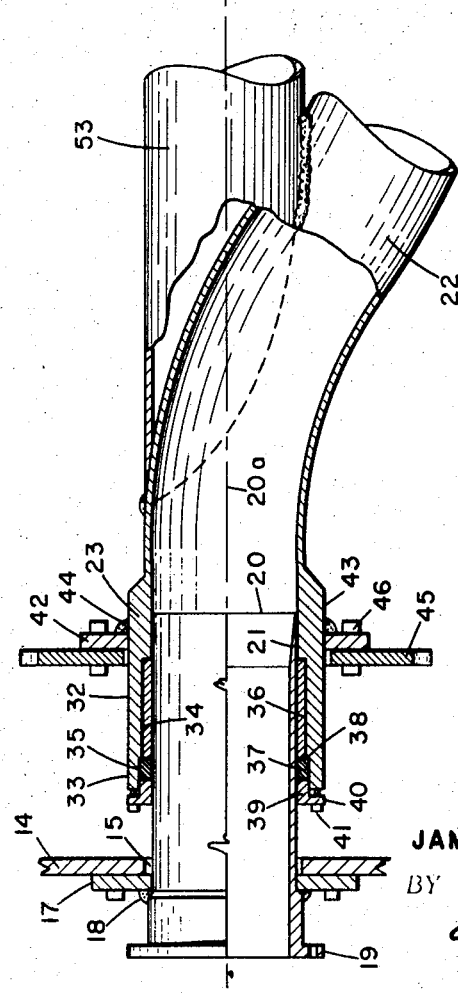

Referring now to FIGS. 1, 2 and 3, diverter valve A has a rigid support frame 10 comprised of four corner posts 11 which are braced by four side members 12. Corner posts 11 interconnect a base plate 13 and a top plate 14, which contains a central opening 15. A primary conduit 16 is fitted into opening 15 and secured to top plate 14 by a retainer flange 17 bolted to top plate 14 and secured to conduit 16, as by welding material 18. Conduit 16 terminates in an upper flange 19, which is adapted to be secured to the terminal flange of single line B. The lower end of conduit 16 terminates in a cylindrical portion 20 having an axis 20–a and an outwardly tapered inner diameter 21. Base plate 13 is substantially normal of axis 20–a. An offset diverter tube 22, which is illustrated in the position it takes when the valve is closed, is rotatably and slideably mounted on the exterior of conduit 16 by a first or upper portion which is formed into a sleeve 23, whereas the second or lower end 24 of the diverter tube, which is offset from axis 20–a and axially spaced from the sleeve 23, is set into a valve head 25, of generally frustoconical shape. Valve head 25 is adapted to contact and engage the valve seat 26 on the communicating end 27 of a selected one of a plurality (four being illustrated) of secondary conduits or conductor ports 28 to effect sealed communication between end 24 and the selected conductor port 28 when the valve is closed. The valve seat 26 of the communicating end 27 of each conductor port 28 is fitted into one of a number, equal to the number of conductor ports 28, of circumferentially spaced openings 29 in base plate 13. The centers of openings 29 are equidistant from axis 20–a. Valve head 25 is mounted to the underside of a rotatable indexing plate 30, which is substantially parallel to base plate 13. Rotation of indexing plate 30, when the valve is open, brings valve head 25 into confronting relationship with any one of the valve seats 26. Indexing plate 30 also mounts on its underside a number, one less than the number of conductor ports 28(a)–28(d), of blanking shoes 31, circumferentially spaced to confront all but one of the conductor ports 28(a)–28(d) when the valve is opened and the valve head 25 is in confronting relationship with one of the conductor ports 28.

Diverter tube 22, in its upper portion or sleeve 23, is maintained in sealing communication with the cylindrical portion 20 of the conduit 16 when stationary and when moving rotationally and slidingly thereon. The inside of diverter tube sleeve 23 is stepped into an intermediate portion 32 and a terminal portion 33 to form recesses 34 and 35 of successively larger inner diameters. A cylindrical bushing 36 occupies recess 33 and journals the cylindrical portion of conduit 16 for rotational movement thereon. Surrounding conduit 16 above bushing 36 to provide sealing communication between sleeve 23 and conduit 16 is a packing structure 37, such as one or a plurality of packing rings or members, at least one of which is rubberlike, and a lowermost one of which may be metallic. The packing structure 37 is maintained against bushing 36 and a shoulder 38 formed by the juncture between the intermediate portion 32 and terminal portion 33 of diverter tube sleeve 23 by packing ring retainer sleeve 39, which is slideably mounted on the exterior of the cylindrical portion 20 of conduit 16 substantially in the upper portion of recess 35. The retainer sleeve 39 terminates in an upper flange 40 that projects outwardly and is secured to the terminal portion 33 of diverter tube sleeve 23 by a plurality of longitudinally extended screws 41 so that diverter tube sleeve 23 and retainer sleeve 39 move as a unit to aid maintenance of a seal between conduit 16 and diverter tube 22. A gear mounting flange 42 is secured about a lower periphery 43 of diverter tube sleeve 23, as by welding material 44, and attaches a circumferentially surrounding spur gear 45 by a plurality of fasteners such as longitudinally extended bolts 46.

The valve head 25 has a downwardly and inwardly inclined tapered surface 47 adapted to seat with companion inner tapered surfaces 48 on the valve seat portion 26 of the communicating end of the selected conductor port when the valve is in the closed position. To prevent leakage between the inversely tapered valve head 25 and valve seat 26 when the valve is closed, a suitable elastomeric seal ring or gasket 49 may be provided in the seat for engagement with the exterior of the valve head 25, or conversely, the seal ring or gasket 49 may be provided in the valve head for engagement with the exterior of the valve seat 26. Valve head 25 is brought into confronting relationship with one of the outlet ports 28 by rotational movement of indexing plate 30 when the valve is in the open position.

Indexing plate 30 contains a central opening 50 coaxial of axis 20–a and to which it secures, as by welding material 51, a waist portion 52 of a diverter tube support post 53, which is attached to diverter tube 22 by weldments. Below indexing plate 30, diverter tube support post 53 is surrounded by a base plate sleeve 54, which is secured to base plate 30, as by welding material 55. Within base plate sleeve 54, diverter tube support post 53 is rotatable and slideable on base plate sleeve bushing 56, which is inserted in a bushing recess 57 in the base plate sleeve, and which is retained therein by base plate sleeve retainer ring 58 secured to the base plate sleeve by a plurality of longitudinally extending screws 59. The lower end 60 of diverter tube support post 53 contains an opening 61 coaxial of axis 20–a. Opening 61 receives a piston rod 62 formed into a lower abutment portion 62–a, an intermediate shank and an upper threaded portion. Piston rod 62 extends from an air cylinder 63, which is retained stationary relative to base plate 13 by a cylinder mount 64 that is bolted to a ring holder 65 secured, as by weldments 66, to a plurality of brackets 67 depending from the indexing plate 30, to which they are attached by weldments.

Diverter tube support post 53 at lower end 60 is rotatably secured to piston rod 62 by a heavy nut 68 screwed onto the threaded end of the piston rod to force a ball bearing assembly contained about the piston rod shank in a piston rod adapter plate 69, which is bolted to the lower end 60, against the abutment portion 62–a of the piston rod. A seal between piston rod adapter plate 69 and abutment 62–a of the piston rod protects the bearings from fouling.

An upstanding guide pin 70 is mounted to the upper side of base plate 13 by a suitable fastener, such as nut and bolt 71, between base plate sleeve 54 and a conductor port 28. The upper end 72 of guide pin 70 is of generally frustoconical shape and is adapted to coact with one of a plurality of guide holes 73 provided equidistant from axis 20–a in indexing plate 30 and circumferentially spaced apart between support post 53 and the lower end 24 of diverter tube 22, on the one hand, and support 53 and each of blanking shoes 31, on the other hand, so that when the valve is being closed, the guiding coaction affords precise registration and alignment between valve head 25 and valve seat 26 so that the correspondingly inclined surfaces 47 and 48 thereof are not damaged.

Blanking shoes 31 are constituted of a seal plate 74 of suitable thickness welded to a circular flange 75 which is secured to the underside end of indexing plate 30 by bolts 76. A suitable rubber or rubberlike seal or gasket 77, which may be platelike or formed into a ring, is secured to the underside of seal plate 74, as by glue or other bonding means, to abut or press against the rim 78 of the valve seats 26 of all but one of the conductor outlets 28 when the valve is closed to close and seal those conductor ports from atmospheric communication.

In a conventional manner, air cylinder 63 is driven by air passed through air hoses 79 attached to a suitable solenoid valve, such as a four-way solenoid valve 80, which may be mounted to base plate 13 by a mounting plate 81. Solenoid valve 80 is adapted to receive air from a compressor station through inlet line 82, and it operates to monitor air to and from air cylinder 63 by the hoses 79 and an exhaust outlet 83, on command, as hereinafter described, to open and close the valve.

When the valve is opened, the rotatable members of diverter valve A are rotated on axis 20–a by means of a drive motor 84, which is rigidly attached to top plate 14 by a motor mount 85 dependent therefrom. Drive motor 84, when energized, turns pinion gear 86, a lower portion 87 of which tapers downwardly and inwardly from a square shouldered upper portion 88. Spur gear 45 is adapted to engage the lower portion 87 of gear 86 when the valve is in the closed position. When air cylinder 63 is actuated to open the valve, spur gear 45 slides in engagement upwardly along the inclined taper of the lower portion 87 of the pinion gear until it moves onto and engages the square shoulder portions 88 thereof. When spur gear 45 is engaged with the upper portion of pinion gear 86, motor 84 can be energized to drive the engaged gears 86, 45 and rotate the retracted, rotatable valve members.

Base plate 13 mounts on its upper side a plurality of circumferentially spaced proximity limit switches 89, just outside the periphery of indexing plate 31. Each proximity limit switch 89 is adjacent a conductor port 28. A metallic standard 90 is secured between the lower end 24 of diverter tube 22 and the periphery of indexing plate 31, and aligned to oppose one of the proximity limit switches 89 when valve head 25 is in a confronting relationship with the communicating end 27 of one of the outlet ports 28. An "up" limit switch 91 and a "down"

limit switch 92 are mounted on the upper surface of base plate 13 immediately adjacent to the periphery of indexing plate 30 for actuation thereby when the valve is being opened or closed, respectively. A zero speed switch 93 is connected to the drive motor 84 to deenergize the motor when standard 90 is opposite a selected one of the proximity limit switches 89. A pair of pull boxes 94 and 95 are secured to corner posts 11 by suitable clamping means for receipt of lead lines from the proximity switches 89 and the "down" limit switch 92, as diagramed in FIG. 4. Lead lines from pull boxes 94 and 95 tie into the control box 96 mounted onto a side member 12 by a holder.

OPERATION

Figure 4:
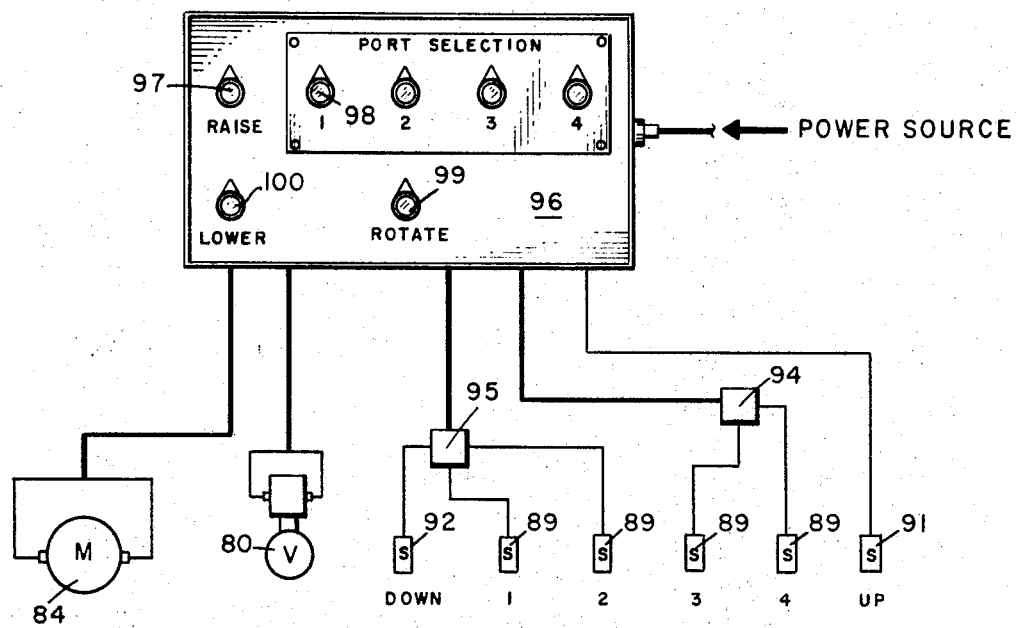
FIG. 4 is a schematic of control mechanisms of the valve of FIG. 1.

The operation of the valve illustrated in the drawings is described in connection with FIG. 4, to which reference is now made. The valve is opened by pressing button 97 which throws a switch, energizing solenoid valve 80 and causing it to monitor air to the air cylinder 63 so that the piston 62 is raised upwardly along the axis 20–a, driving diverter tube support post 53 upward through base plate sleeve 54. Support post 53 directs this upward thrust onto the shaft of diverter tube 22 and causes diverter tube sleeve 23 to slide upwardly along the cylindrical portion 20 of conduit 16. During the upward movement of diverter tube 22, communication is maintained between conduit 16 and sleeve 23. The upward drive of sleeve 23 pushes spur gear 45 upward in engagement with the inclined portion 87 of pinion gear 86 until it is meshed with the square shoulder portion 88 thereof. As support post 53 is being driven upward, it lifts attached indexing plate 30, disengaging guide holes 73 from guide pin 70 and, also, valve head 25 from valve seat 26 of conductor port 28 to open the valve. The upward movement of indexing plate 30 trips the "up" limit switch 91 to connect drive motor 84 to an electrical source.

When piston rod 62 is fully extended from air cylinder 63 so that the valve is fully opened, selection is made of the conductor port 28 that connects with the second hydraulic or pneumatic line C to which communication with the first hydraulic or pneumatic line B is desired. The conductor port button on the control panel corresponding to the selected conductor port 28, e.g., button No. 1, indicated by reference numeral 98, is then depressed to energize the proximity switch 88 adjacent that port. The rotate button 99 on the control panel is then pushed to energize drive motor 84. Drive motor 84 turns pinion gear 86 and spur gear 45 to rotate sleeve 23 of diverter tube 22 about cylindrical portion 20 of conduit 16. Rotation of diverter tube 22 simultaneously rotates support post 53 within base plate sleeve 54 about piston rod 62 by means of piston adapter plate 69 which rides on the moving races of the ball bearing assembly. Indexing plate 30 attached to support post 53 and to diverter tube 22 by valve head 25 carries metal standard 90, adjacent valve head 25, toward the energized proximity switch selected. As metal standard 90 approaches and approximates the energized proximity limit switch of the selected conductor port 28, the proximity limit switch is actuated to close a reverse current circuit to drive motor 84. The reversal of current slows the drive motor speed to zero speed, at which point zero speed switch 93 is actuated to turn off the current to the motor and stop the drive of spur gear 45. The center of the valve head 25 is then aligned in confronting relationship with the axis of the communicating end 27 of the selected conductor port within a tolerance determined by the precision fit of the gears 45, 86. The precise alignment necessary to set the tapered surface 47 of valve head 25 down onto the companion inverse tapered surface of valve seat 26 without damage to such surfaces is provided by the coaction of a guide hole 73 and the frustoconical upper portion of guide pin 70, as described below. In addition, each of the blanking shoes 31 is in a confronting relationship with the communicating ends 27 of the remaining conductor ports 28 not selected for communication with the diverter tube.

The valve is closed by depressing the "lower" button 100 on the control panel. This reverses solenoid valve 80, which causes the piston and piston rod 62 of air cylinder 63 to retract. Support post 53 follows the downward movement of piston rod 62, sliding diverter tube sleeve 23 downwardly along the cylindrical portion 20 of conduit 16. As diverter tube sleeve 23 moves downward, it draws spur gear 45 off the square shoulder portion 88 of pinion gear 86 onto the tapered portion 87 thereof, thereby providing some slack in between the gears. Indexing plate 30, following the downward movement of support post 53, is enabled by the provision of slack to allow its guide hole 73 to slide along the frustoconical head of guide pin 70 until the hole 73 is directly centered on the shaft of the pin, thereby bringing the inwardly inclined tapered surface 47 of valve head 46 into exact registration with the companion inner tapered surface 48 of valve seat 26. The downward travel of indexing plate 30 trips "down" limit switch 92, disconnecting the electrical source to drive motor 84. When piston rod 62 is fully retracted into air cylinder 63, diverter tube 22 is axially moved and valve head 25 is sealingly engaged with valve seat 26 of the communicating end 27 of the selected conductor port 28, a sealing relationship being forceably maintained therebetween at conveying pressures of the pneumatic conveying system by the air cylinder. Because the electrical source to drive motor 84 was disconnected by the tripping of "down" switch 92, valve head 25 and valve seat 26 cannot be inadvertently damaged by actuation of motor 84 when the valve head and valve seat are engaged. As a result of the above operation, sealed communication is established between pneumatic line B and the selected pneumatic line C (a source line B and selected destination line C in the illustration).

The described form of the invention will maintain a static pressure of about 25 p.s.i.g. or higher. A white neoprene seal ring is suitable for such pressures, and the package structure may suitably be of Teflon or glass-filled Teflon. By using highly polished metal surfaces on the sealing surfaces of the communicating valve head of the offset tube and on the seats of the communicating end of the conductor ports, and employing therebetween a hard but deformable annular seal ring of small cross-sectional diameter, the conveying pressure can be raised to about 150 p.s.i.g. without leakage of conveying gas across the closed valve. Alternatively, leak-free operation at elevated conveying pressures may be obtained by using resilient materials for one or both of the communicating ends of the offset tube and conductor ports. The force product of the cross-sectional area of the piston head of the air cylinder times the air pressure on the piston head must be greater than the conveying pressure to enforce a sealing relationship of the communicating and sealing ends of the offset tube and selected conductor port, and the extent to which the product is greater must take into account how much of force is used to contact, either lightly or heavily, the blanking shoes on the communicating ends of the conductor ports. The nature of the head and seat design of the offset tube and conductor port must also be taken into account.

In addition to the above variations, the lower or second end of the offset diverter tube may be outwardly tapered to be of female character and the communicating end of the conduit may be inwardly tapered to be of male character. Any plurality of conductor ports may be used, depending on the need of the user. The diameter of the conductor ports will normally be about that of the pneumatic line to which it is adapted for connection. It is highly desirable that the offset of the diverter tube be as sinuous and nonangular as possible in order to avoid generation of turbulence and transient pressure rise of the conveying gas as it travels through the valve.

I claim:
1. A valve for selectively distributing particulate matter between a first line and a plurality of second lines, comprising:
   a. a primary stationary conduit for connection with the first line, terminating in a cylindrical portion having an axis;

b. a plurality of secondary stationary conduits for connection with the second lines, each having communication means equidistant from said axis and circumferentially spaced in a first plane perpendicular to said axis;

c. a diverter tube having a first end rotatably and axially slideably mounted on said cylindrical portion in sealing communication therewith, said diverter tube having a second end axially spaced from said first end and offset from said axis equidistant the distance of said communication means from said axis, said second end having means for communicating with and sealingly engaging the communication means of a predetermined one of said secondary conduits when said second end is axially moved to contact said communication means thereof, said second end being rotatable about said axis to positions in confronting relationship with each of said communication means when said second end is axially spaced and disengaged from one of said communication means;

d. means for rotating said first and second ends about said axis;

e. means for causing movement of said first and second ends along said axis; and f. means for forcing said means of said second end and said communication means of said selected secondary conduit into sealing relationship.

2. A valve according to claim 1 in which said communication means of said secondary conduits and said means of said second end of said diverter tube are of inverse taper and either the means of the second end or the communication means carries an annular elastomeric sealing member, whereby either the means of the second end or the communication means is adapted to matingly insert into the other for sealing engagement.

3. The valve of claim 1 further comprised of means for guiding said means of said second end into registered communication with the communication means of said selected one of said secondary conduits during movement of said second end along said axis to contact said communication means.

4. A valve for selectively distributing particulate matter between a first line and a plurality of second lines, comprising:

a. a primary stationary conduit for connection with the first line, terminating in a cylindrical portion having an axis;

b. a plurality of secondary stationary conduits for connection with the second lines, each having communication means equidistant from said axis and circumferentially spaced in a first plane perpendicular to said axis;

c. a diverter tube having a first end rotatably and axially slideably mounted on said cylindrical portion in sealing communication therewith, said diverter tube having a second end axially spaced from said first end and offset from said axis equidistant the distance of said communication means from said axis, said second end having means for communicating with and sealingly engaging the communication means of a predetermined one of said secondary conduits when said second end is axially moved to contact said communication means thereof, said second end being rotatable about said axis to positions in confronting relationship with each of said communication means when said second end is axially spaced and disengaged from said one of said communication means;

d. closure means mounted for axial and rotational movement with said diverter tube, said closure means and said second end being equidistant from said axis and circumferentially spaced on a second plane perpendicular to said axis between said cylindrical portion and said first plane so that said closure means confronts the communication means not confronted by said second end when said second end is in a confronting relationship with one of said communication means, said closure means engaging and closing the communication means not confronted by said second end when said second end is axially moved to contact and sealingly engage said communication means of said one of said secondary conduits;

e. means for rotating said first and second ends and said closure means about said axis;

f. means for causing movement of said first and second ends and of said closure means along said axis; and g. means for forcing said means of said second end and said communication means of said one of said secondary conduits into sealing relationship.

5. A valve according to claim 4 in which said communication means of said secondary conduits and said means of said second end of said diverter tube are of inverse taper and either the means of the second end or the communication means carries an annular elastomeric sealing member, whereby either the means of the second end or the communication means is adapted to matingly insert into the other for sealing engagement.

6. The valve of claim 4 further comprised of means for guiding said means of said second end into registered communication with the communication means of said selected one of said second conduits during movement of said second end and said closure means along said axis to contact said communication means.

7. A valve for selectively distributing particulate matter from a source line to a predetermined one of a plurality of destination lines, comprising:

a. a stationary inlet conduit for connection with the source line, terminating in a cylindrical portion having an axis;

b. a plurality of stationary discharge conduits for connection with the destination lines, each having seat means equidistant from said axis and circumferentially spaced in a first plane perpendicular to said axis;

c. an offset tube having sleeve means at a first end rotatably and axially slideably mounted on said cylindrical portion;

d. sealing means between said sleeve means and said cylindrical portion for maintaining sealed communication between said first end of said offset tube and said inlet conduit during movement of said sleeve on said cylindrical portion;

e. said offset tube having a second end axially spaced from said first end and offset from said axis a distance equal to the distance of said seat means from said axis, said second end terminating in seating surfaces adapted to matingly and sealingly engage the seat means of a predetermined one of said discharge conduits and establish communication between said discharge conduit and said second end when said second end is axially moved to contact said seat means thereof, said second end being rotatable about said axis to positions in confronting relationship with each of said seats when said second end is axially spaced and disengaged from one of said seat means;

f. closure means mounted for axial and rotational movement with said offset tube, said closure means and said second end being equidistant from said axis and circumferentially spaced on a second plane perpendicular to said axis between said cylindrical portion and said first plane so that said closure means confront the seat means not confronted by said second end when said second end is in confronting relationship with one of said seat means, said closure means engaging and closing the seat means not confronted by said second end when said second end is axially moved to contact and sealingly engage said seat means of said one of said secondary conduits;

g. means for rotating said first and second ends and said closure means about said axis;

h. means for causing movement of said first and second ends and of said closure means along said axis;

i. means for forcing said seating surfaces of said second end and said seat means of said discharge conduits into sealing relationship; and j. means for guiding said seating surfaces of said second end into registered communication with the seat means of said selected one of said discharge conduits during movement of said second end and said closure means along said axis to contact said seat means.